United States Patent [19]

Nusbaum et al.

[11] Patent Number: 4,675,506

[45] Date of Patent: Jun. 23, 1987

[54] NON-THERMOSTATIC CONSTANT TEMPERATURE DEVICE FOR FOOD HEAT MAINTENANCE

[76] Inventors: Max Nusbaum, 715 Ave. S, Brooklyn, N.Y. 11223; Alter Paneth, 1411 41st St., Brooklyn, N.Y. 11218

[21] Appl. No.: 831,867

[22] Filed: Feb. 24, 1986

[51] Int. Cl.⁴ .................... F27D 11/02; H05B 3/06
[52] U.S. Cl. ................................ 219/405; 219/409; 219/347; 219/349; 219/411
[58] Field of Search ............... 219/405, 411, 354, 408, 219/409, 347, 348, 349

[56] References Cited

U.S. PATENT DOCUMENTS

| Re. 24,296 | 3/1967 | Stewart | 219/405 |
|---|---|---|---|
| 1,135,473 | 4/1915 | Vath | 219/409 |
| 1,294,269 | 2/1919 | Hopkins | 219/409 |
| 1,884,978 | 10/1932 | Jones | 219/405 |
| 1,969,614 | 8/1934 | Klopfenstein | 219/409 |
| 2,134,474 | 10/1938 | Gillespie | 219/405 |
| 2,434,166 | 1/1948 | Klumpp | 219/409 |
| 2,767,297 | 10/1956 | Benson | 219/411 |
| 2,864,932 | 12/1958 | Forrer | 219/405 |
| 3,334,620 | 8/1967 | DeWerth | 219/354 |
| 3,418,453 | 12/1968 | Sparks | 219/405 |
| 3,548,146 | 12/1970 | Hoyland | 219/408 |
| 4,164,643 | 8/1979 | Peart | 219/411 |
| 4,249,067 | 2/1981 | Cummings | 219/405 |

FOREIGN PATENT DOCUMENTS 75953 10/1917 Switzerland .................... 219/409

OTHER PUBLICATIONS

Nyce, Larry, "Build a Portable Oven", Model Railroader, Jun. 1980, p. 98.
Herrera, Nicolas M., "A Simple and Inexpensive Ring Oven", Jour. of Chem. Ed., vol. 50, No. 1, Nov. 1973, p. 756.

Primary Examiner—E. A. Goldberg
Assistant Examiner—Teresa J. Walberg
Attorney, Agent, or Firm—Israel Nissenbaum

[57] ABSTRACT

A low cost non-thermostatic device which maintains food at a constant equilibrium temperature between about 150° F. to 180° F. (65° C. to 82° C.) for extended periods of time, i.e. in excess of four hours, without detrimental burning or deterioration of the food. Food is maintained at a palatable heated temperature above that required to either kill bacteria or prevent bacterial growth. The device is a substantially closed receptacle, with minimal sufficient venting of accumulated moisture, having insulated walls preferably with interior reflective surfaces and an incandescent light bulb as a heat source. Constant temperature is maintained by minimizing venting and relating bulb wattage to interior receptacle volume, and the rate of heat loss through the receptacle walls. Such heat loss is related to the degree of interior wall reflectivity and/or the extent of the interior wall insulation.

13 Claims, 3 Drawing Figures

U.S. Patent  Jun. 23, 1987  4,675,506
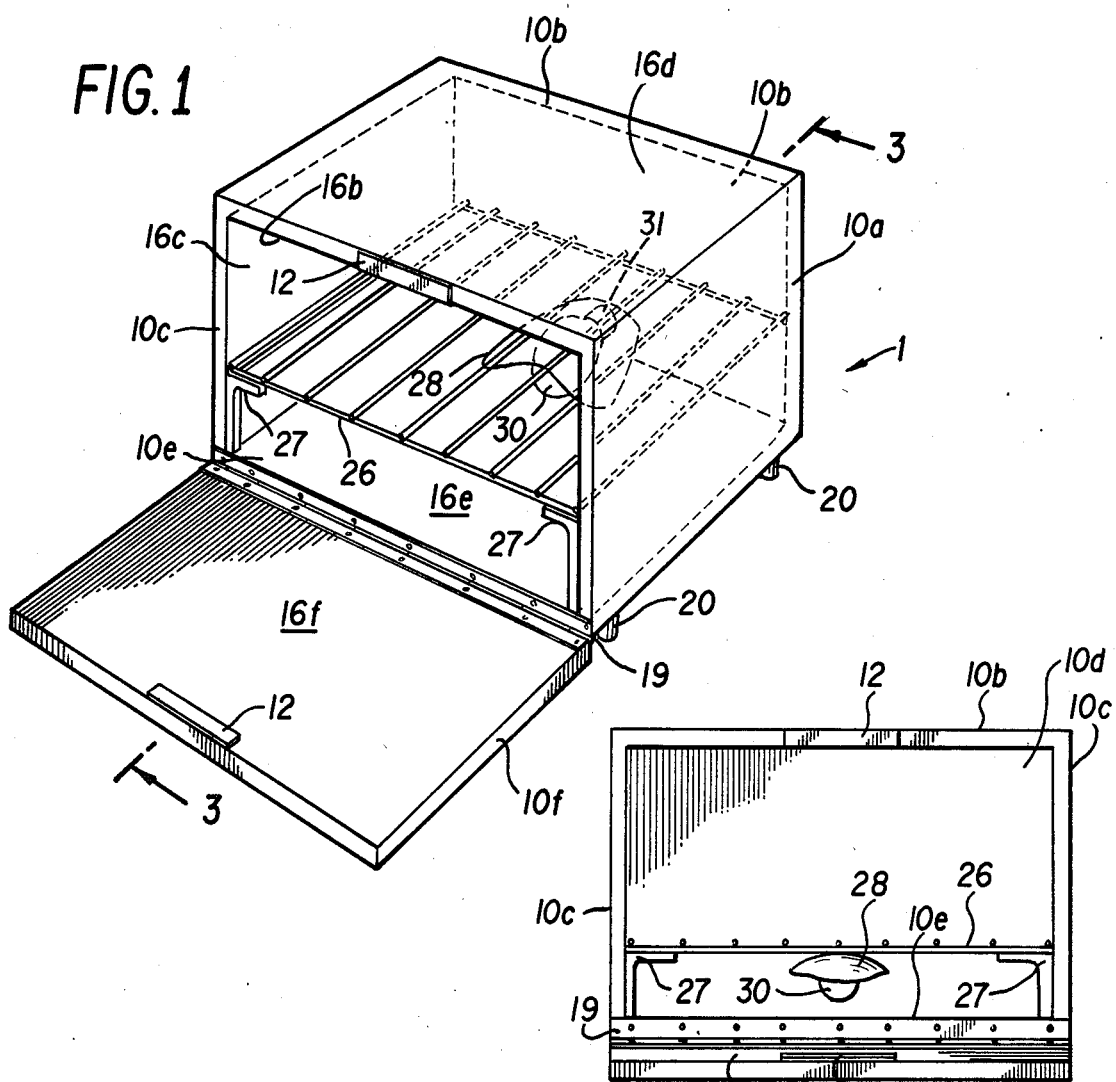
FIG. 1
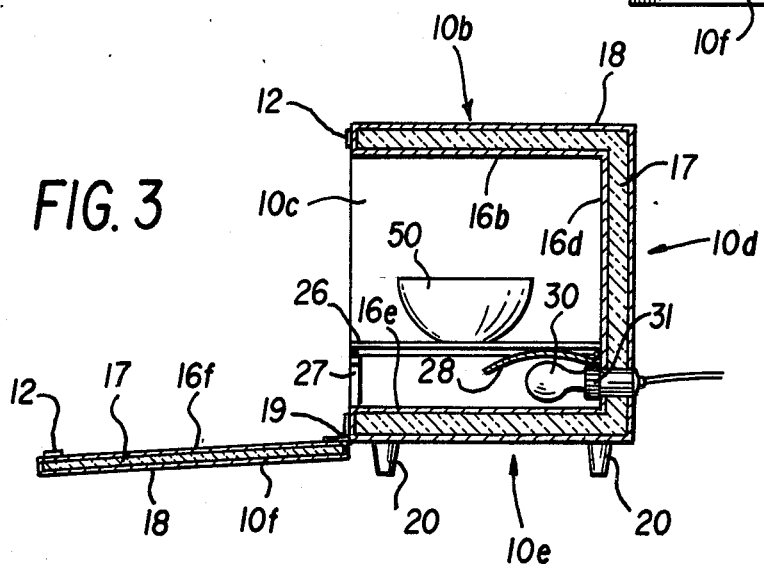
FIG. 2
FIG. 3

NON-THERMOSTATIC CONSTANT TEMPERATURE DEVICE FOR FOOD HEAT MAINTENANCE

This invention relates to methods and devices for maintaining constant food temperatures and particularly to heating devices utilizing incandescent light bulb heat sources.

Electrical or resistance heating devices designed for maintaining food at constant elevated temperatures are exemplified by the warm or low settings of electric ovens and broilers, warming trays and ambient exposed natural gas or other fuel type burners. Either the devices provide a very low heat, such as is common with warming trays, or the devices maintain a constant temperature by means of a thermostatic element which serves as a switch to continually open and close current or fuel flow to the heating elements. For the most part such devices are not designed for more than temporary food heat maintenance generally not more than an hour. Consistent long term heating with thermostatically controlled devices, in excess of several hours, may tend to deteriorate the thermostatic elements because of the constant mechanical movements involved or, in the instance of electric heating devices, contact deterioration caused by electrical arcing during the on/off cycles. Since resistive elements are involved in heating with electric elements, the currents used are high and the arcing particularly severe. In applications where long term food heat maintenance is required, such as for caterers at affairs or for workers who wish to prepare dinners in the morning prior to leaving for work and have such dinners ready for consumption upon their return, such devices are inappropriate. Devices known as slow cookers have some utility for the latter application but such slow cookers have drawbacks in utility since they generally require that the foods being cooked be either in liquid form or immersed in a liquid medium otherwise there is a tendency to deteriorate by overheating or burning with continued added heat.

It is an object of the present invention to provide a non-thermostatic constant temperature device, for long term heat maintenance of food, with said device having an incandescent light bulb heat source.

Though incandescent light bulbs have been used in the past as a heat source, such applications have never entailed long term food heat maintenance.

Such prior applications have included the heating of rocks (U.S. Pat. No. 3,769,495), toy baking ovens (U.S. Pat. No. 4,249,067), the drying or airing of fabrics (U.S. Pat. No. 3,138,699), use as a foot warmer (Swiss Pat. No. 217 192), and a means for keeping milk bottles at a temperature slightly above freezing to prevent milk from freezing on exceedingly cold days (U.S. Pat. No. 1,912,818). Except for the last patent which involves very minimal heating, such inventions have all involved the utilization of incandescent light bulbs within very confined areas with a high degree of venting being required. In fact the fabric dryer and foot warmer have as their primary purpose the actual venting of heat to heat or dry externally placed objects. Toy ovens, the most common application, specifically intend to concentrate heat to a small baking chamber to attain a relatively high baking temperature of about 320° F. (160° C.). As a result, such toy ovens are safely utilizable for only short periods of time, generally about 15-20 minutes. Additionally, such toy ovens require a high degree of venting, particularly since the user is a child, in order to prevent possible excessive heat accumulation and burns.

It is another object of the present invention to provide a non-thermostatic food heat maintenance device with an incandescent light bulb heat source which provides a substantially constant temperature, for extended periods of time, between about 150° to 180° F. (65°-82° C.), with minimal heat venting.

It is a further object of the present invention to provide such device wherein food is maintained at palatable levels for hours without drying out or burning, even without a liquid medium therefor, and wherein detrimental bacteria growth is prevented.

It is a still further object of the present invention to provide an economical method for maintaining food temperature at a constant level for extended periods of time.

These and other objects, features and advantages of the present invention will become more evident from the following discussion and drawings in which:

FIG. 1 is an isometric view of the constant temperature device of the present invention shown in the open configuration;

FIG. 2 is a front view thereof; and

FIG. 3 is a cross sectional view of the device as taken along line 3—3 of FIG. 1 with a food container shown positioned therein.

Generally the present invention comprises an economical method and device for maintaining a non-thermostatic controlled substantially constant temperature for long term heat maintenance of food at a bacteria killing level between about 150° F. to 180° F. (65°-82° C.) with the minimum level for such bacteria killing being between 135°-140° F. (57°-60° C.). Such constant temperature is at a palatable level for the food and is maintained for periods of time in excess of 4 hours and even to 24 hours and beyond without substantial food degradation. Palatable cooked temperatures for meat, for example, range from about 140° F. (60° C.) for rare meat to about 190° F. (88° C.) for well done poultry. Temperatures above such levels tend, on extended periods of time, to cause said food degradation. It is in fact preferred that the long term temperatures not exceed 180° F. (82° C.). In accordance with the method of the present invention the food is heated with an incandescent light bulb heat source within an enclosure having walls which maintain a constant temperature between 150° F. to 180° F. (65°-82° C.).

The non-thermostatic controlled constant temperature device of the present invention is comprised of an incandescent light bulb heat source contained within a substantially enclosed receptacle, preferably of rectangular configuration, comprises of insulated and preferably also interiorly heat reflective walls. The receptacle further comprises an opening for introduction therein of food with such opening being substantially closed by an insulated access door during such long term heating. The device comprises non-thermostatic means for maintaining a constant temperature between 150° F. to 180° F. (65°-82° C.) and preferably at about 160° F. (71° C.) after temperature equilibrium is reached within the receptacle. Such means preferably comprises a combination of parameters related to bulb wattage or level of the heat source, the interior volume of the receptacle, and the degree at which heat is lost through the receptacle walls, including the access door, as determined by the insulative and/or reflective properties of the receptacle walls, and access door, all with a minimal amount of venting of mositure from the receptacle. It is preferred that the receptacle walls, including access door, be comprised of an insulative material, with structural integrity, and having an R rating of from 2 to 5 and most preferably of about 3 with a minimal one inch (2.54 cm) thickness and a reflective interior surface of such walls being at least 70% and preferably 80% reflective. Though incandescent light bulbs are not generally designed for use as heating elements and their ratings are measured in watts and lumens, the wattage is directly related to resistance and heating capability. In accordance with the present invention (taking into account the aforementioned insulation and reflectivity characteristics of the receptacle walls and access door) the wattage is directly related to the interior volume of the receptacle in a ratio of about 70 to 80 watts (of substantially container heat) per cubic foot (0.028 m$^3$) of interior volume in order to provide a constant temperature (after reaching temperature equilibrium) in the range of 150° to 180° F. (65°–82° C.). Venting is generally required only for the purpose of permitting condensation moisture from the food to escape. Such venting area is accordingly minimal and does not exceed about 2 square inches (12.9 cm$^2$) per cubic foot (0.028 m$^3$) of volume (about 0.1% of the perimeter walls of a one foot (30.5 cm) cube). It is preferred that the opening for food introduction be a removable wall of the receptacle or a hinged wall section with such opening being substantially closed during the equilibrium heating. Sufficient venting for the condensation moisture may in fact be afforded by a loosely sealed interface between the removable wall and the other walls when the receptacle is closed.

The constant temperature is reached after a period of time generally of several hours and is partially dependent upon the initial temperature of the food placed within the receptacle and the volume thereof. The receptacle reaches temperature equilibrium faster with cooked food, generally about 2 to 3 hours, then with frozen food, generally at least 8 hours. Depending upon the volume of the food and its heat transmittance, the food itself may act as a heat sink and be heated to a higher temperature than that of the receptacle. Accordingly, the maximum constant temperature for the receptacle is somewhat lower than that required for high heat food temperature maintenance.

The incandescent bulb heat source is preferably located at the lower portion of the receptacle to ensure uniform heat distribution therewithin with a maxiumum of utilizable interior volume. Accordingly, a shield member is positioned thereabove to prevent spattering of food directly on the bulb. In a preferred embodiment of the present invention, an open rack (which permits ready flow of heat therethrough) for support of food, is positioned within the receptacle above the bulb and is supported by the walls of the receptacle. The shield member is integrated with said rack. Since the device of the present invention maintains a constant temperature, the rack is in a fixed position for maximum volume utilization.

The costs involved in utilizing the constant temperature device of the present invention are low. For example, assuming a kilowatt hour charge of 10 cents, the device can be operated with a 75 watt bulb for about 13 hours for 10 cents. Additionally, an inexpensive (between 30 to 75 cents for a standard 100 watt bulb) incandescent bulb has a rated life of about 750 hours. The bulb can be readily changed and there is no other maintenance required, aside from cleaning, since there are no moving parts. This is in contrast to broilers or other electrical heating devices wherein heating elements are expensive and their replacement is difficult and in many cases not even possible.

In order to obviate cleaning and to retain moisture within the hot food it is preferred that the food be contained within a lossely covered container or within aluminum foil. Such expedient is however not availing in ovens and broilers wherein such loose covering is insufficient to prevent drying out of food during long term heat maintenance.

Though the device of the present invention is operable without venting, it is preferred for applications wherein frozen food is brought to the equilibrium temperature, with a large amount of moisture condensation that such moisture be permitted to vent with a minimal venting of no more than about 2 square inches (12.9 cm$^2$) per cubic foot (0.028 m$^3$) of volume as described above. Preferably the minimal spacing between the access door and the edges of the other walls is generally sufficient for such moisture condensation venting.

For household utilization the size of the receptacle generally ranges between 1 to 1.3 cubic feet (0.028–0.036 m$^3$) of volume with incandescent bulbs of standard wattages 60, 75, 100, 125 and 150 being appropriately utilized according to the wattage to volume ratio fo about 75 watts/cubic foot (0.028 m$^3$) of volume. The device of the present invention operates by a very slow but steady heat loss through the walls of the receptacle (including the access door) to achieve and then maintain a specific equilibrium temperature in the range of 150° to 180° F. (65°–82° C.). Incremental heat generated by the incandescent bulb is substantially balanced by such heat loss to maintain the equilibrium temperature. Since the heat loss is very slow because of the insulated nature of the receptacle walls and the reflective properties of the interior, ambient conditions external to the device result in only slight deviations of the equilibrium temperature. Excessive direct venting is accordingly to be avoided since interior temperature is more subject to change accordingly to the ambient conditions. Additionally, such excessive venting renders the device less efficient in energy utilization.

A preferred embodiment of the device of the present invention comprises a substantially heat retaining receptacle having inch thick walls comprised of an insulation material made of highly densified glass wool with a density of 3 pcf and an insulation R factor of 3. An exemplary material having such characteristics in Knapsfiberglass available from the Shelby Voolve Company. Such material is structurally rigid with an outer supporting and aesthetic layer of aluminum. Other insulative materials useful in accordance with the present invention include urethane as well as other insulative materials resistant to thermal degradation by a constant heat of 180° F. (82° C.), the maximum operating temperature of the device of the present invention. The insulative characteristics of the receptacle walls should not be below that of an inch thick material having an R factor of 2 or an R factor higher than about 5. Insulative characteristics below those of the former, permit too high a rate of heat loss whereby a constant temperature at the requisite levels is difficult to maintain. Insulative characteristics above those of the latter result in an overinsulated device wherein additional generated heat from the incandescent bulb heat source is not dissipitated at a rapid enough rate to prevent food degradation. Change in bulb wattage may compensate for such differences in insulation characteristics. However such change is at the cost of energy inefficiency with a high wattage bulb or high insulative material cost and/or unwiedly bulkiness with a low wattage bulb.

The insulative material is preferably externally covered with a metallic supportive layer or alternatively such insulative material may be contained within a hard shell of plastic for structural stability. The interior walls of the receptacle are faces with a heat reflective material such as of polished aluminum being at least 70% and preferably at least 80% reflective of radiated heat. An example of a useful reflective facing material is specular lighting aluminum sheet available from Adams Metal Products designated CoilZX having a highly reflective H-18 temper with a thickness of 0.032" (0.08 cm).

The combination of parameters of bulb wattage, interior volume, and the rate of heat transmission through the walls (as determined by the insulation thereof and the reflectivity of the interior of such walls) provide the means for maintaining long term constant temperature control at the requisite level between 150° F. to 180° F. (65°-82° C.). Such means permits heat dissipation through the receptacle walls to maintain a constant equilibrium temperature without more than a slightly perceptible, if any, heating of the receptacle exterior. Since the parameters are interrelated, a change in one necessitates a concomitant change in one or more of the others to maintain the proper equilbirium temperature. In any event, excess venting to ambient, of generally more than two square inches of vents (12.9 cm$^2$) per cubic foot (0.028 m$^3$) of volume, is to be avoided since ambient conditions may vary considerably thereby radically affecting operation of the device in maintaining a long term constant temperature at a requisite level.

With minimal venting being maintained, variations in the aforementioned factors result in different equilibrium temperatures. Thus, increasing wattage, decreasing volume, increasing the insulation factor of the receptacle walls or increasing interior wall-facing reflectivity all tend to increase the equilibrium temperature. If not carefully controlled, burned food and possible damage to the receptacle itself are likely results. Decreasing wattage, increasing volume, decreasing the insulation factor of the receptacle walls or decreasing interior wall-facing reflectivity all tend to decrease the equilibrium temperature. If not carefully controlled, the food is subjected to long term low level heating, a situation ideal for bacteria growth and food spoilage.

With specific reference to the drawings, FIGS. 1-3 depict a constant temperature device receptacle 1, in accordance with the present invention, having a generally rectangular configuration and being comprised of walls 10a-f. Wall 10f is detachable from the other walls, in order to provide an access door to the device interior, and is moveably attached to bottom wall 10e by piano hinge 19. Access wall 10f is designed to open downwardly to facilitate such access in an uobstructed manner. Receptacle walls 10a-e including access wall 10f are all of a generally uniform thickness with access wall 10f being sized to fittingly overlap, at its periphery, the edges of walls 10a-d to effect a substantially complete closure. Magnetic catch 12 serves to hold the wall 10f in the closed position with a somewhat loose closure whereby a small degree of moisture condensation venting is possible between the periphery of wall 10f and the edges of walls 10a-d, sufficient for the device during operation. Surfaces 16a-f of the receptacle walls are all comprised of a highly heat reflective aluminum material. The reflective aluminum material is backed by an inch thick core section of insulative densified glass wool 17 with such glass wool being in turn covered by structurally supportive outer aluminum layer 18.

Incandescent bulb 30, provides the heat source for the constant temperature device, and is located at the bottom of the interior of receptacle 1. Bulb 30 is mounted within socket 31, which extends through receptacle wall 10d for connection to an external electrical source. Food support wire rack 26 is positioned directly above bulb 30 and is supported by brackets 27 in walls 10a, 10c and 10d. The wire rack 26, since it is substantially open, provides for facilitated heat dispersal within the receptacle whereby a uniform temperature is more readily maintained. Metallic arced shield member 28 is shaped to be integrated with rack 26 and is positioned directly above bulb 30 as a protective shield against food spilling or spattering on the bulb. FIG. 3 depicts the positioning of a bowl of food 50 on the wire rack 26 above the bulb 30. Rubber legs 20 serve to prevent slipping movement of the receptacle and minimize spilling of food within the receptacle.

In order to more clearly illustrate the efficacy of the present invention the following example is presented. It is understood that details contained therein are not to be construed as limitations on the present invention.

EXAMPLE

A receptacle as shown in the drawings with dimensions 16"×12"×12" (40.6×30.5×30.5 cm) with a total volume of about 1.33 cubic feet (0.038 m$^3$) is constructed of 1" (2.54 cm) thick densified glass wool insulation walls with an R factor of 3 and a density of 3 pcf. The interior of the walls are faced with 80% heat reflective aluminum sheets. A standard 100 watt Westinghouse light bulb is used as a heat source. After temperature equilibrium is reached at 160° F. (71° C.) such temperature is maintained for at least 24 hours in an ambient room temperature conditions. Foods including chili, potato pudding, soup, noodles, carrots, lima beans, poultry and beef meats are placed within the receptacle and are maintained at the 160° F. (71° C.) temperature (after equilibrium temperature is reached) without burning or any significant drying out after periods in excess of 15 hours.

It is understood that the above example as well as the drawings of a preferred embodiment are illustrative of the non-thermostatic constant temperature device of the present invention and changes such as those involving dimensions, configuration, materials, and parameter variations are possible without departing from the scope of the present invention as defined in the following claims.

What is claimed is:

1. A non-thermostatic constant temperature device, for the long term heat maintenance of food, comprising a receptacle having an incandescent light bulb as a heat source contained therewithin, characterized in that said receptacle comprises means for maintaining a substantially constant equilibrium cooking temperature for said food of between 150° F. to 180° F. (65°-82° C.) for periods in excess of four hours after said equilibrium cooking temperature is initially obtained, wherein said receptacle is comprised of insulated walls and wherein said means for maintaining a substantially constant equilibrium cooking temperature comprises a combination of parameters comprising:

(a) the wattage of said bulb;
(b) the interior volume of said receptacle; and
(c) the rate of heat transmission through said walls; whereby the rate at which heat, generated by said bulb to heat up the interior of said receptacle, is substantially balanced by heat transmission through said insulated walls of said receptacle whereby said long term constant equilibrium cooking temperature is maintained for periods of time in excess of four hours without deterioration of said food and wherein said receptacle further comprises a venting area from the interior thereof which is sufficient to vent accumulated moisture from said food but is not more than 2 square inches (12.9 cm$^2$) for every cubic foot (0.028$^3$ m) of said interior volume.

2. The device of claim 1 wherein one wall of said receptacle is movable from the other walls to provide an access door to the interior of said receptacle and wherein said receptacle has said venting area between said access door and the walls with which said door is movably adjacent thereto when said door is closed.

3. The device of claim 1 wherein for every cubic foot (0.028 m$^3$) of said interior volume of said receptacle the wattage of said bulb ranges between 70–80 watts.

4. The device of claim 1 wherein said insulated walls are comprised of structurally self supportive densified glass wool.

5. The device of claim 1 wherein the interior surfaces of said walls are faced with a reflective material having a reflectivity between 70 to 80%.

6. The device of claim 5 wherein said reflective material is comprised of polished aluminum.

7. The device of claim 1 wherein said incandescent light bulb is positioned at the lower portion of said receptacle.

8. The device of claim 7 wherein said receptacle further contains a rack for support of food thereupon, wherein said rack is of a substantially open configuration permitting substantially unrestricted heat flow therethrough and wherein said rack is positioned adjacently above said incandescent light bulb.

9. The device of claim 8 wherein said rack is integrated with a shield member whereby said bulb is shielded from food spilling or spattering.

10. A non-thermostatic constant temperature device for the long term heat maintenance of food comprising a receptacle having an incandescent light bulb as a heat source contained therewithin, characterized in that said receptacle comprises insulated walls having an interior reflective surface, wherein the bulb wattage ranges between 70 to 80 watts per cubic foot (0.028$^3$ m) of interior volume of said receptacle, wherein said walls are comprised of a material having an insulation R factor ranging between 2 and 5, wherein said interior reflective surface of said walls are at least 70% heat reflective, and wherein said receptacle further comprises a venting area from the interior of said receptacle which is sufficient to vent accumulated moisture from said food but is not more than 2 square inches (12.9 cm$^2$) for every cubic foot (0.028$^3$ m) of said interior volume, whereby a substantially constant equilibrium cooking temperature between 150° F. to 180° F. (65°–82° C.) for said food is maintained for periods of time in excess of four hours, after said equilibrium temperature is initially obtained, without deterioration of said food.

11. The device of claim 10 wherein said walls are comprised of densified glass wool having an insulation factor of 3 and a thickness of about 1 inch (2.54 cm), wherein said interior reflective surface is at least 80% reflective, wherein said bulb wattage is 100 and said interior volume is about 1.33 cubic feet (0.038 m$^3$).

12. A method for the constant temperature maintenance of food at temperatures between 150° F. to 180° F. (65°–82° C.) comprising the steps of placing said food within a receptacle having an incandescent light bulb as a heat source contained therewithin; providing means for permitting sufficient heat to pass through the walls of said receptacle at a rate whereby an equilibrium cooking temperature for said food between 150° F. and 180° F. (65°–82° C.) is maintained for at least four hours after being initially obtained; and venting accumulated moisture from said food, wherein venting area from the interior of said receptacle is sufficient to vent said accumulated moisture from said food but is not more than 2 square inches (12.9 cm$^2$) for every cubic foot (0.028$^3$ m) of interior volume of said receptacle, and wherein said receptacle is comprised of insulated walls and wherein said means for maintaining a substantially constant equilibrium cooking temperature comprises a combination of parameters comprising:

(a) the wattage of said bulb;
(b) the interior volume of said receptacle; and
(c) the rate of heat transmission through said walls; whereby the rate at which heat, generated by said bulb to heat up the interior of said receptacle, is substantially balanced by heat transmission through said insulated walls of said receptacle whereby said long term constant cooking temperature is maintained without deterioration of said food.

13. The method of claim 12 wherein the bulb wattage ranges between 70 to 80 watts per cubic foot (0.028$^3$ m) of interior volume of said receptacle.

* * * * *